United States Patent
Zheng et al.

(10) Patent No.: US 9,965,085 B2
(45) Date of Patent: May 8, 2018

(54) DISPLAY SUBSTRATE, DRIVING METHOD THEREOF AND DISPLAY DEVICE FOR CONNECTING TOUCH ELECTRODES WITH A COMMON VOLTAGE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yi Zheng, Beijing (CN); Zhiyong Wang, Beijing (CN); Shuai Xu, Beijing (CN); Zhengxin Zhang, Beijing (CN); Yezhou Fang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 122 days.

(21) Appl. No.: 14/908,463

(22) PCT Filed: Sep. 29, 2015

(86) PCT No.: PCT/CN2015/091006
§ 371 (c)(1),
(2) Date: Jan. 28, 2016

(87) PCT Pub. No.: WO2016/155273
PCT Pub. Date: Oct. 6, 2016

(65) Prior Publication Data
US 2017/0038886 A1 Feb. 9, 2017

(30) Foreign Application Priority Data

Mar. 31, 2015 (CN) .......................... 2015 1 0149284

(51) Int. Cl.
*G06F 3/041* (2006.01)
*G06F 3/044* (2006.01)

(52) U.S. Cl.
CPC ............ *G06F 3/0416* (2013.01); *G06F 3/041* (2013.01); *G06F 3/0412* (2013.01); *G06F 3/044* (2013.01); *G06F 2203/04103* (2013.01)

(58) Field of Classification Search
CPC ...... G06F 3/0416; G06F 3/0412; G06F 3/041; G06F 2203/04103; G06F 3/044; G06F 3/0418
See application file for complete search history.

(56) References Cited

U.S. PATENT DOCUMENTS

| 8,390,582 B2 * | 3/2013 | Hotelling ................ G06F 3/044 345/173 |
| 2012/0086665 A1 * | 4/2012 | Song .................... G02F 1/13338 345/174 |

(Continued)

FOREIGN PATENT DOCUMENTS

| CN | 102955635 A | 3/2013 |
| CN | 203149548 U | 8/2013 |

(Continued)

OTHER PUBLICATIONS

First Office Action regarding Chinese Application No. 201510149284.5, dated Apr. 1, 2017. Translation provided by Dragon Intellectual Property Law Firm.

(Continued)

*Primary Examiner* — Darlene M Ritchie
(74) *Attorney, Agent, or Firm* — Harness, Dickey & Pierce, P.L.C.

(57) ABSTRACT

The present disclosure provides a display substrate, a driving method thereof and a display device. The display substrate includes a touch region. Multiple touch electrodes are arranged in columns at the touch region, and the touch (Continued)

electrodes in each column are connected together. At a touch detection stage, the 5 touch electrodes in each column at the touch region are disconnected from the touch electrodes in the other columns, and at a display stage, the touch electrodes in the columns at the touch region are connected together and serve as common electrodes.

19 Claims, 4 Drawing Sheets

(56) References Cited

U.S. PATENT DOCUMENTS

| | | | | |
|---|---|---|---|---|
| 2012/0086879 | A1* | 4/2012 | Yu | G06F 3/0412 349/33 |
| 2012/0162089 | A1* | 6/2012 | Chang | G06F 3/0412 345/173 |
| 2014/0104510 | A1 | 4/2014 | Wang et al. | |
| 2014/0132560 | A1* | 5/2014 | Huang | G06F 3/044 345/174 |
| 2014/0184944 | A1 | 7/2014 | Ma et al. | |
| 2015/0103048 | A1* | 4/2015 | Nakayama | G06F 3/044 345/174 |
| 2015/0168761 | A1* | 6/2015 | Chang | G02F 1/13338 349/12 |
| 2016/0004371 | A1* | 1/2016 | Kim | G06F 3/0418 345/173 |
| 2016/0041664 | A1 | 2/2016 | Qin et al. | |
| 2016/0109996 | A1 | 4/2016 | Ye | |
| 2016/0266694 | A1* | 9/2016 | Lee | G06F 3/0412 |
| 2016/0349917 | A1* | 12/2016 | Bai | G02F 1/13 |
| 2017/0038886 | A1 | 2/2017 | Zheng et al. | |
| 2017/0336917 | A1* | 11/2017 | Noguchi | G06F 3/044 |

FOREIGN PATENT DOCUMENTS

| | | |
|---|---|---|
| CN | 203706191 U | 7/2014 |
| CN | 104020881 A | 9/2014 |
| CN | 104166489 A | 11/2014 |
| CN | 104280920 A | 1/2015 |
| CN | 104714695 A | 6/2015 |

OTHER PUBLICATIONS

Written Opinion of the International Searching Authority and International Search Report regarding International Application No. PCT/CN2015/091006, dated Dec. 28, 2015. Translation provided by Dragon Intellectual Property Law Firm.

Third Chinese Office Action regarding Application No. 201510149284.5 dated Nov. 16, 2017. English translation provided by http://globaldossier.uspto.gov.

* cited by examiner

DISPLAY SUBSTRATE, DRIVING METHOD THEREOF AND DISPLAY DEVICE FOR CONNECTING TOUCH ELECTRODES WITH A COMMON VOLTAGE

CROSS-REFERENCE TO RELATED APPLICATIONS

The present application is a national phase of PCT Application No. PCT/CN2015/091006 filed on Sep. 29, 2015, which claims a priority to the Chinese patent application No. 201510149284.5 filed on Mar. 31, 2015, which are incorporated herein by reference in their entireties.

TECHNICAL FIELD

The present disclosure relates to the field of display technology, in particular to a display substrate, a driving method thereof and a display device.

BACKGROUND

Touch screens are becoming more and more popular due to such advantages as convenient operation, multiple functions, declining price and increasing yield. The touch screens may include add-on touch screens and in-cell touch screens. For the add-on touch screen, a touch panel is arranged in front of a display panel. The touch panel includes a viewable region corresponding to a display region of the display panel, and a user may achieve touch-control by touching the viewable region. For the in-cell touch screen, a touch function is integrated into the display panel. A protective glass screen is attached onto a surface of the display panel, and the user may operate by touching the glass screen with his finger.

In order to simplifying a manufacture process as well as reducing thickness of the display panel, a common electrode in an existing display substrate may further serve as touch electrodes.

SUMMARY

A display substrate is provided in the present disclosure, to prevent the occurrence of uneven brightness due to different common voltages.

In one aspect, the present disclosure provides a display substrate including a touch region. Multiple touch electrodes are arranged in columns at the touch region, and the touch electrodes in each column are connected together. At a touch detection stage, the touch electrodes in each column at the touch region are disconnected from the touch electrodes in the other columns, and at a display stage, the touch electrodes in all the columns at the touch region are connected together and serve as common electrodes.

In a possible implementation, the display substrate further includes a set of switching units, and a control signal line connected to a control end of each switching unit in the set of switching units. The touch electrodes in each column are connected to a first end of one switching unit in each set of switching units, the touch electrodes in the respective columns at the touch region are connected to different switching units, and second ends of the switching units in the set of switching unit are connected to each other. At the touch detection stage, the switching units in the set of switching units are turned off under the control of the control signal line, and at the display stage, the switching units in the set of switching units are turned on under the control of the control signal line.

In a possible implementation, the display substrate further includes a common electrode line, to which the second ends of the switching units in the set of switching units are connected.

In a possible implementation, the display substrate includes a driver circuit located at a lower portion of the display substrate.

In a possible implementation, the set of switching units is located at an upper portion of the display substrate and at a position opposite to that of a connecting end of the driver circuit, the connecting end of the driver circuit being used to connect with the touch electrodes in the respective columns.

In a possible implementation, a number of the set of switching units and a number of the common electrode line are both two. The second ends of the switching units in one set of switching units are connected to one common electrode line, and the second ends of the switching units in the other set of switching units are connected to the other common electrode line. One set of switching units and one common electrode line connected to the one set of switching units are located at a first side of the display substrate, and the other set of switching units and the other common electrode line connected to the other set of switching units are located at a second side of the display substrate opposite to the first side. The touch electrodes in each column are connected to the first end of one switching unit in the set of switching units located at the first side of the display substrate and to the first end of one switching unit in the set of switching units located at the second side of the display substrate.

In a possible implementation, the display substrate includes multiple touch regions, a number of the columns of the touch electrodes at each touch region is identical to a number of the switching units in each set of switching units. The touch electrodes in an $i^{th}$ column at each touch region are connected to the first end of an $i^{th}$ switching unit in each set of switching units, where i is a positive integer greater than or equal to 1 and less than or equal to the number of the switching units in each set of switching units.

In a possible implementation, there are twelve columns of the touch electrodes at each touch region and twelve switching units in each set of switching units.

In a possible implementation, the multiple touch regions respectively correspond to multiple sets of switching units, the multiple sets of switching units are arranged at a first side of the display substrate or a second side of the display substrate opposite to the first side, the multiple touch regions are arranged sequentially along a direction from the upper portion of the display region to the lower portion of the display substrate, and the multiple sets of switching units corresponding to the multiple touch regions are arranged sequentially along the direction from the upper portion of the display region to the lower portion of the display substrate.

In a possible implementation, for each touch region of the multiple touch regions, one set of switching units is arranged at each of a first side and a second side opposite to the first side of the display substrate. The multiple touch regions are arranged sequentially along a direction from the upper portion of the display substrate to the lower portion of the display substrate, multiple of sets of switching units corresponding to the multiple touch regions and located at the first side of the display substrate are arranged sequentially along the direction from the upper portion of the display substrate to the lower portion of the display substrate, and multiple sets of switching units corresponding to the multiple touch regions and located at the second side of the display substrate is arranged sequentially along the direction from the upper portion of the display substrate to the lower portion of the display substrate.

In a possible implementation, when one touch region is closer to the upper portion of the display substrate, the set of switching units corresponding to the one touch region is closer to the upper portion of the display substrate, and when one touch region is farther away from the upper portion of the display substrate, the set of switching units corresponding to the one touch region is farther away from the upper portion of the display substrate.

In a possible implementation, the sets of switching units are arranged at a peripheral region.

In a possible implementation, the sets of switching units are arranged at a dummy region of the peripheral region.

In a possible implementation, each switching unit in the set of switching units is an N-type transistor and the control signal line is a gate-controlled high level signal line.

In a possible implementation, the touch electrodes in the respective columns are used to provide a touch detection driving signal.

In a possible implementation, the display substrate is an array substrate or a color filter substrate.

In a second aspect, the present disclosure provides a method for driving the above-mentioned display substrate, including: connecting touch electrodes in the respective columns at the touch region to each other at the display stage; and disconnecting the touch electrodes in each column at the touch region from the touch electrodes in the other columns at the touch detection stage.

In a third aspect, the present disclosure provides a display device including the above-mentioned display substrate.

According to the embodiments of the present disclosure, the touch electrodes in the respective columns at each touch region are connected to source electrodes of switching units in each set of switching units via touch electrode lines, and drain electrodes of the switching units are connected to each other. At the display stage, the switching units are turned on, so as to connect the touch electrodes in each column at the touch region to corresponding touch electrode lines. As a result, it is able to effectively reduce a resistance of each touch electrode line and reduce a voltage drop across each touch electrode line at the display stage, thereby preventing the occurrence of uneven display brightness.

DETAILED DESCRIPTION OF THE EMBODIMENTS

Figure 1:
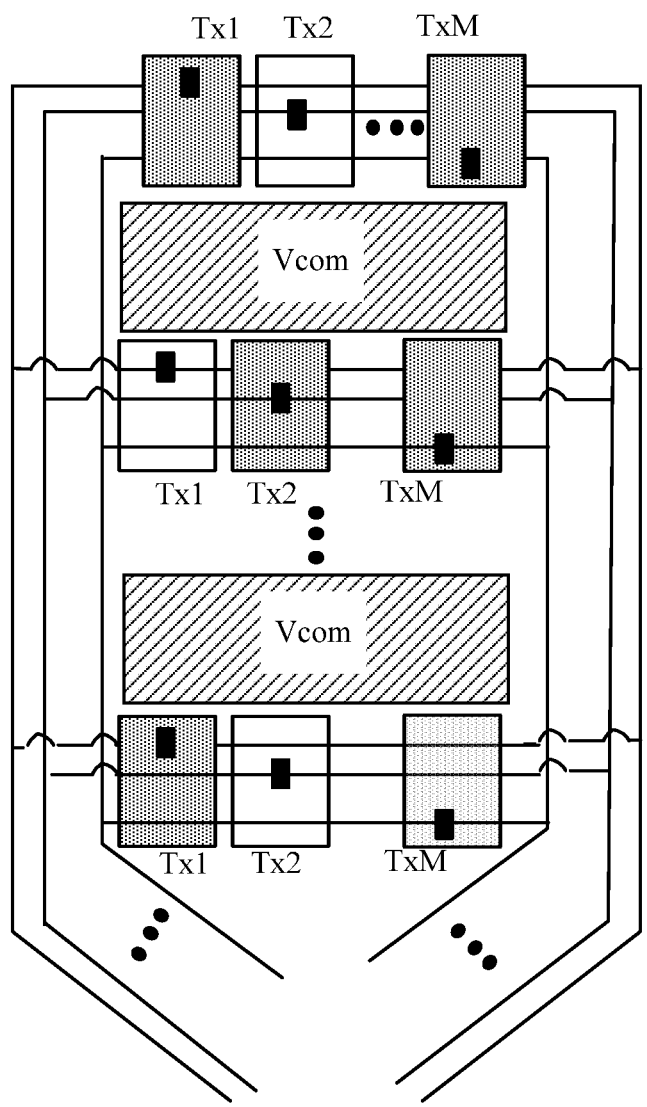
FIG. 1 is a schematic view showing a part of an existing display substrate.

As shown in FIG. 1, which is a schematic view showing a part of an existing display substrate, the display substrate includes touch electrodes (Tx 1, . . . , Tx M) in columns and common electrodes Vcom, where TX i represents the touch electrodes in an $i^{th}$ column. Each touch electrode is connected to a driver circuit via a touch electrode line. At a display stage, a common voltage is applied by the driver circuit to respective touch electrodes via the touch electrode lines, and the touch electrodes serve as common electrodes. At a touch detection stage, a touch detection signal is applied by the driver circuit to respective touch electrodes via the touch electrode lines, so as to perform a touch detection operation.

According to the display substrate in FIG. 1, each touch electrode line is of a relatively large resistance, and when the common voltage is applied to each touch electrode via the touch electrode line at the display stage, there is a relatively large voltage difference between an actual common voltage across a touch electrode away from the driver circuit and the common voltage output by the driver circuit. Each common electrode Vcom is of a relatively small resistance, and an actual common voltage across the common electrode away from the driver circuit is substantially equal to the common voltage output by the drier circuit. Hence, at the display stage, the actual voltages across the touch electrode and the common electrode away from the driver circuit are different from each other. As a result, brightness at a pixel region corresponding to the touch electrode is different from brightness at a pixel region corresponding to the common electrode, and the brightness of the entire display substrate is uneven.

In order to make technical solutions of the present disclosure more apparent, the present disclosure is described hereinafter in a clear and complete manner in conjunction with the drawings and embodiments. Obviously, the following embodiments merely relate to a part of, rather than all of, the embodiments of the present disclosure. Other embodiments obtained by a person skilled in the art may obtain based on these embodiments without any creative effort all fall within the scope of protection of the present disclosure.

Figure 2:
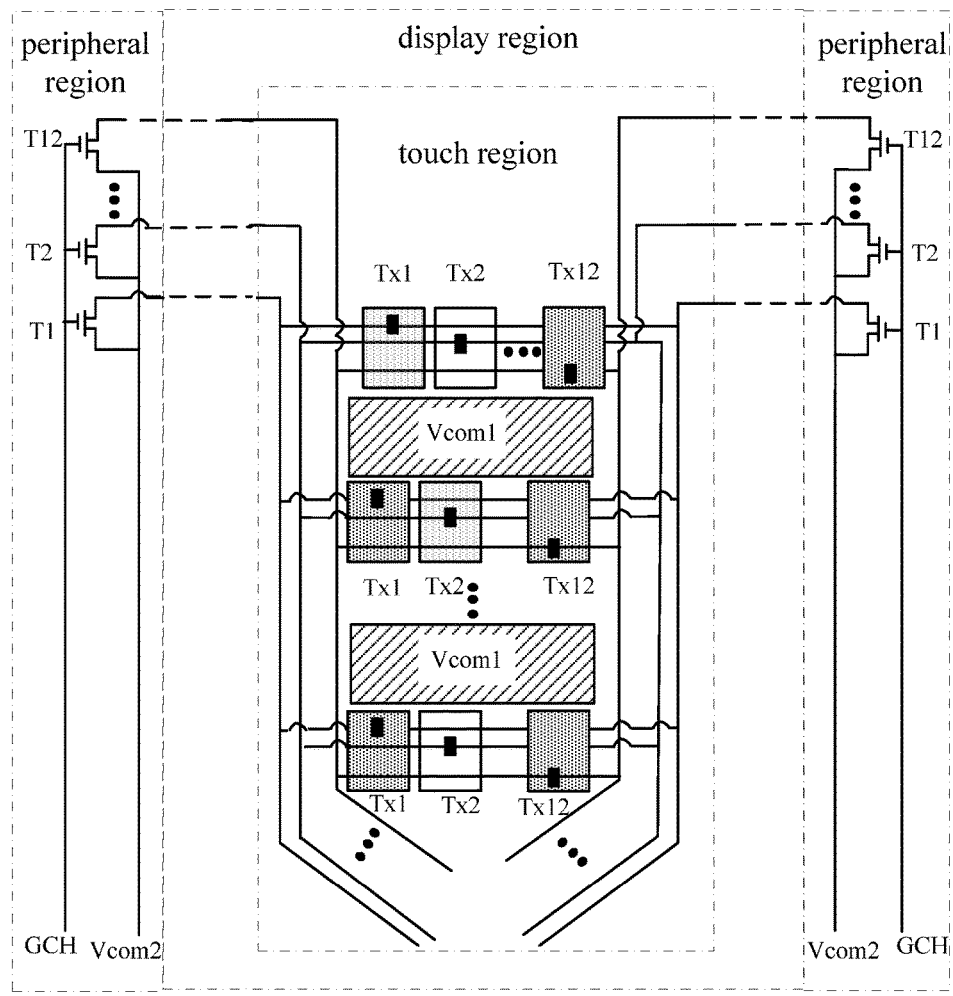
FIG. 2 is a schematic view showing a display substrate according to an embodiment of the present disclosure.

The present disclosure provides in some embodiments a display substrate, which includes a display region and a peripheral region. The display region is partitioned into multiple touch regions. As shown in FIG. 2, the display substrate includes twelve columns of touch electrodes at one touch region (Tx i represents an $i^{th}$ column of touch electrode). Each column includes multiple touch electrodes. Each touch electrode in the respective columns is connected to a driver circuit (not shown) located at a lower portion of the display substrate via a corresponding touch electrode line. Meanwhile, common electrodes Vcom1 are arranged at the touch region. At a touch detection stage, a touch detection signal is applied to the touch electrodes; at a display stage, a common voltage is applied to the touch electrodes and the common electrodes. One set of switching transistors, a common electrode line Vcom2 and a gate-controlled high level signal line GCH are arranged at each of a left peripheral region and a right peripheral region at an upper portion of the display substrate. Each set of switching transistors includes 12 N-type transistors, a drain electrode of each transistor is connected to a corresponding common electrode line Vcom2, and a gate electrode of each transistor is connected to a corresponding signal line GCH. At each touch region, the touch electrode lines connected to the touch electrodes in the $i^{th}$ column (i is less than or equal to 12) are connected to a source electrode of an $i^{th}$ switching transistor in the set of switching transistors on the left, and to a source electrode of an $i^{th}$ switching transistor in the set of switching transistors on the right.

At the display stage, a high level is applied to the gate-controlled high level signal lines GCH, so as to turn on the switching transistors in the two sets of switching transistors, thereby connecting the touch electrodes in all columns to each other.

At the touch detection stage, a low level is applied to the gate-controlled high level signal lines GCH, so as to turn off the switching transistors in the two sets of switching transistors, thereby disconnecting the touch electrodes in each column from the touch electrodes in the other columns.

According to the embodiments of the present disclosure, the touch electrodes in each column at each touch region are connected to the source electrode of a corresponding switching transistor in each set of switching transistors via touch electrode lines, and the drain electrodes of the switching transistors are connected to each other. At the display stage, the touch electrodes in all columns at the touch region and corresponding touch electrode lines can be connected all together by turning on the switching transistors. As a result, it is able to effectively reduce a resistance of each touch electrode line, reduce a voltage drop over each touch electrode line at the display stage, and reduce a voltage difference between an actual common voltage across each touch electrode away from the driver circuit and the common voltage Vcom across the common electrode Vcom1, thereby preventing the occurrence of uneven display brightness.

In addition, in the embodiments of the present disclosure, the sets of switching transistors are arranged at the upper portion of the display substrate, and the driver circuit is arranged at the lower portion of the display substrate, i.e., the sets of switching transistors are arranged opposite to the driver circuit. The source electrode of each switching transistor in each set of switching transistors is further connected to the common electrode line Vcom2. In this way, it is able to, at the display stage, apply the common voltage to the touch electrodes in each column from the upper portion, thereby further reducing the voltage difference between the actual common voltage applied to each touch electrode at the upper portion of the display substrate and the common voltage Vcom across the common electrode Vcom1. Of course, during the actual application, the source electrodes of the switching transistors may be connected to each other rather than connected to the common electrode lines, and at this time, it is also able to effectively reduce a resistance of each touch electrode line and reduce the voltage difference between the actual common voltage applied to each touch electrode away from the driver circuit and the common voltage across the common electrode Vcom1, thereby preventing the occurrence of uneven display brightness; technical solution in accordance with the above arrangement shall fall within the scope of protection of the present disclosure. Correspondingly, it is also unnecessary to arrange the sets of switching transistors at the left and right peripheral regions at the upper portion of the display substrate.

In addition, in the embodiments of the present disclosure, one set of switching transistors is arranged at each of the left and right peripheral regions at the upper portion of the display substrate, so as to connect left and right ends of each touch electrode line to the common electrode lines, thereby reducing a transverse voltage drop across each touch electrode line and preventing the occurrence of uneven display brightness in a transverse direction due to the transverse voltage drop. Of course, during the actual application, one set of switching transistors and one common electrode line may be arranged merely at the left or the right peripheral region at the upper portion of the display substrate, and all touch electrode lines may be connected to the common electrode line via the switching transistors in the set of switching transistors, so as to prevent the occurrence of uneven display brightness in a longitudinal direction; technical solutions in accordance with such arrangement shall fall within the scope of protection of the present disclosure.

Figure 5:
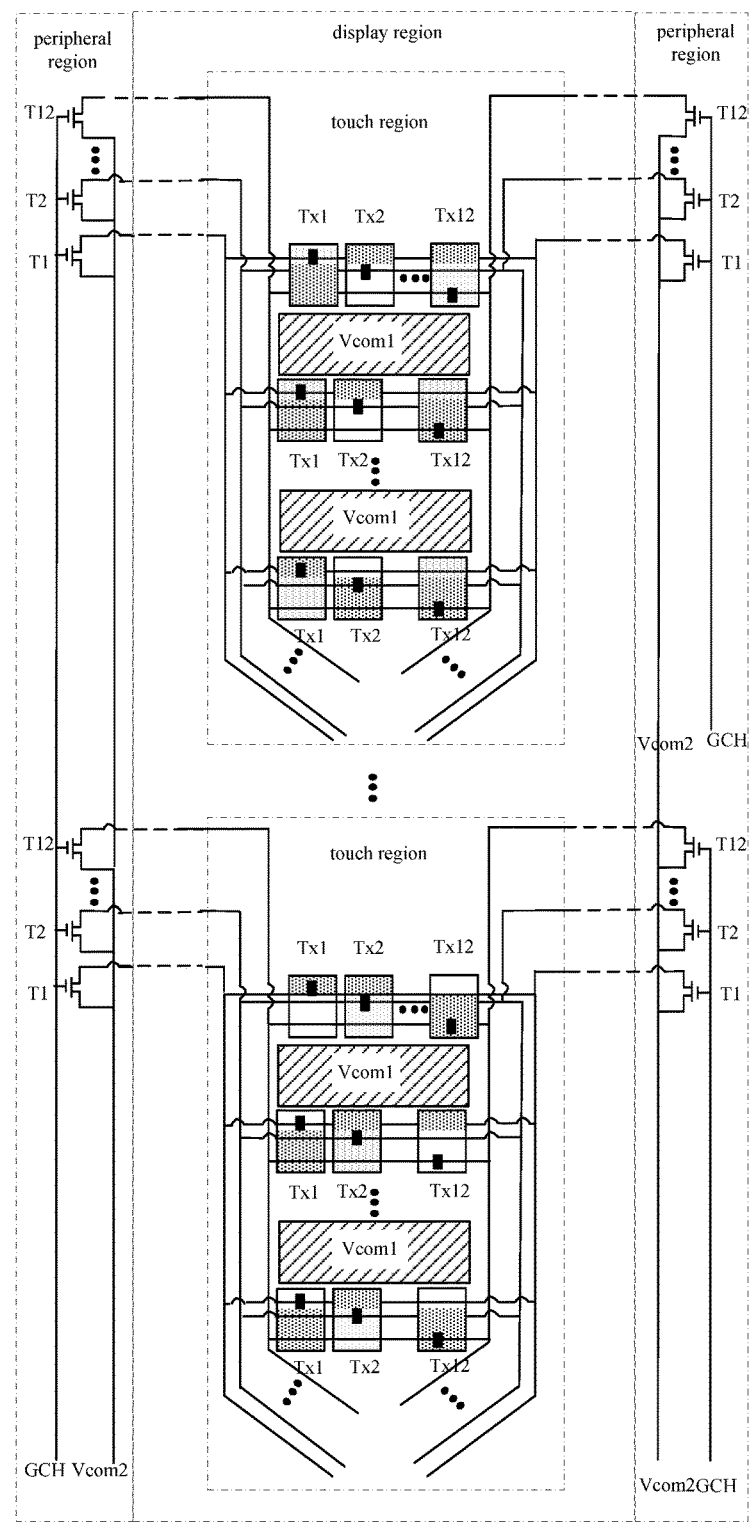
FIG. 5 is a schematic view showing a display substrate according to an embodiment of the present disclosure.

In addition, in the embodiments of the present disclosure, the touch electrodes in the $i^{th}$ column at each touch region are connected to the $i^{th}$ switching transistor in each set of switching transistors. In this way, for all the touch electrodes in the entire display substrate, it is merely necessary to arrange one set of switching transistors at the left or right peripheral region of the display substrate, and the set of switching transistors merely includes the switching transistors at an amount identical to a number of the columns of the touch electrodes; or, it is merely necessary to provide one set of switching transistors at each of the left and right peripheral regions of the display substrate, and each set of switching transistors includes the switching transistors at an amount identical to the number of the columns of the touch electrodes. As a result, it is able to reduce the number of the sets of switching transistors. It should be appreciated that, during the actual application, for each touch region, one set of switching transistors may be arranged at a left or right peripheral region of the display substrate, or one set of switching transistors may be arranged at each of the left and right peripheral regions of the display substrate. At this time, the touch electrodes in all columns at each touch region may be connected to each other at the display stage, so as to prevent the occurrence of uneven display brightness. In a possible implementation, as shown in FIG. 5, the multiple touch regions are arranged sequentially at the display region along a direction from the upper portion of the display substrate to the lower portion of the display substrate, and correspondingly, the sets of the switching transistors corresponding to the multiple touch regions are arranged sequentially at the peripheral region along the direction from the upper portion of the display substrate to the lower portion of the display substrate. The direction from the upper portion of the display substrate to the lower portion of the display substrate is just a direction in which each column of touch electrodes extend. Optionally, when one touch region is closer to the upper portion of the display substrate, the set of switching transistors corresponding to the touch region is closer to the upper portion of the display substrate, and when one touch region is farther away from the upper portion of the display substrate, the set of switching transistors corresponding to the touch region is farther away from the upper portion of the display substrate. In this way, the common voltage may be applied to the touch electrodes at each touch region via the a set of transistors relatively close to the touch region, so as to reduce the voltage difference between the common voltage across each touch electrode and the common voltage across the common electrode.

It should be appreciated that, when one set (or two sets) of switching transistors are arranged for each touch region, the multiple touch regions may be deemed as a large touch region, and the one set (or two sets) of switching transistors corresponding to the multiple touch regions may be deemed as one large set (or two large sets) of switching transistors. At this time, it is deemed that the display substrate includes the large touch region and one large set (or two large sets) of switching transistors corresponding to the large touch region, and the touch electrodes in each column at the large touch region are connected to one corresponding transistor in each large set of switching transistors.

In the embodiments of the present disclosure, each switching transistor in each set of switching transistors is an N-type transistor, and each gate-controlled high level signal line GCH further serves as a control signal line, so as to control the switching transistors in the set of switching transistors. In this way, it is unnecessary to provide a control signal line separately, thereby simplifying the manufacture process for the display substrate. Of course, during the actual application, one or more control signal lines may also be provided separately to control the switching transistors in the set of switching transistors, so as to prevent the occurrence of uneven display brightness in the longitudinal direction; technical solution in accordance with such arrangement shall also fall within the scope of protection of the present disclosure.

During the actual application, the switching transistors in each set of switching transistors may also be replaced with other switching units having a switching function, and corresponding technical solutions shall fall within the scope of protection of the present disclosure.

In the embodiments of the present disclosure, the set(s) of switching transistors and the gate-controlled high level signal line(s) are provided so as to, at the touch detection stage, disconnect the touch electrodes in each column at the touch region from the touch electrodes in the other columns, and at the display stage, connect the touch electrodes in all columns at the touch region to serve as the common electrodes. However, during the actual application, the structure of the display substrate is not limited thereto and the above described structure shall not be regarded as limitation of the scope of protection of the present disclosure.

The above description is given based on the case that the touch electrodes are transmission touch electrode wires for transmitting a touch detection driving signal output by the driver circuit. Alternatively, during the actual application, the touch electrodes may be reception touch electrode wires for receiving a detected touch signal.

In the embodiments of the present disclosure, the sets of switching transistors are arranged at the peripheral region of the display substrate, so as to prevent the displaying from being adversely affected. Furthermore, the sets of switching transistors may be arranged at a dummy region, so as to save the room and provide a narrow bezel. Of course, during the actual application, when the sets of switching transistors are arranged at the display region, it is also able to effectively reduce the resistance of each touch electrode line and reduce the voltage difference between the actual common voltage applied to each touch electrode away from the driver circuit and the common voltage across the common electrode, thereby preventing the occurrence of uneven display brightness; corresponding technical solutions shall also fall within the scope of protection of the present disclosure.

During the implementation, the number of the columns of the touch electrodes and the number of the switching transistors in each set of switching transistors may not be limited to 12.

During the implementation, the display substrate may be an array substrate or a color filter substrate. Whether the display substrate is the array substrate or the color filter substrate may not affect implementation of the present disclosure and corresponding technical solutions shall also fall within the scope of protection of the present disclosure.

The present disclosure provides, in another aspect, a method for driving the above-mentioned array substrate. The method includes steps of: at the touch detection stage, disconnecting the touch electrodes in each column at the touch region from the touch electrodes in the other columns; and at the display stage, connecting the touch electrodes in respective columns at the touch region to each other.

In this way, at the display stage, it is able to remarkably reduce the voltage difference between the actual common voltage applied to the touch electrode away from the driver circuit and the common voltage output by the driver circuit. The common voltage applied to the touch electrode is substantially equal to that across the common electrode, thereby preventing the occurrence of uneven display brightness.

Figure 3:
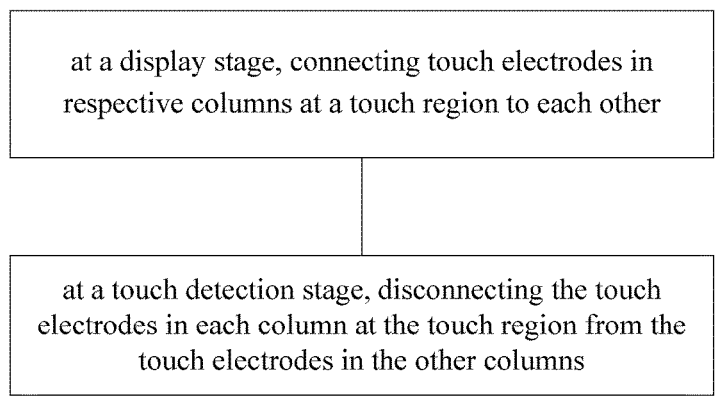
FIG. 3 is a flow chart of a method for driving a display substrate according to an embodiment of the present disclosure.
Figure 4:
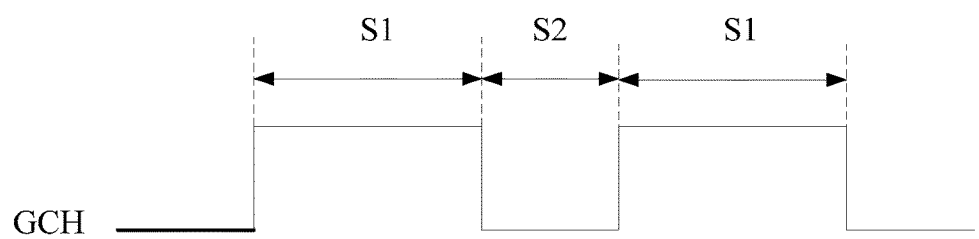
FIG. 4 is a sequence diagram of GCHs when driving the display substrate in FIG. 2.

With respect to the pixel circuit in FIG. 2, the driving method, as shown in FIG. 3, includes steps of: at the display stage S1, applying a high level signal to the gate-controlled high level signals GCH so as to turn on the switching transistors in each set of switching transistors; and at the touch detection stage S2, applying a low level signal to the gate-controlled high level signal lines GCH, so as to turn off the switching transistors in each set of switching transistors.

The present disclosure provides, in a third aspect, a display device including the above-mentioned display substrate. The display device may be any product or member having a display function, such as an electronic paper, a mobile phone, a tablet computer, a television, a display, a laptop computer, a digital photo frame or a navigator.

The above are merely the preferred embodiments of the present disclosure and the disclosure is not limited thereto. Modifications and replacement which can be easily obtained by a person skilled in the art without departing from the principle of the present disclosure shall all fall within the scope of protection of the present disclosure. Hence, the scope of protection of the present disclosure shall be in accordance with the protection scope defined by the claims.

What is claimed is:

1. A display substrate, comprising:
   a touch region, wherein:
      a plurality of touch electrodes are arranged in columns and rows at the touch region,
      the touch electrodes in each column are directly connected together,
      at a touch detection stage, the touch electrodes in each column at the touch region are disconnected from the touch electrodes in the other columns, and
      at a display stage, the touch electrodes in all the columns at the touch region are connected together and serve as common electrodes;
   at least one set of switching units; and
   for each switching unit in the at least one set of switching units, a control signal line connected to a control end of the switching unit, wherein:
      for each column of the columns, the touch electrodes in the column are connected to a first end of a corresponding switching unit in the at least one set of switching units,
      the touch electrodes in the respective columns at the touch region are connected to different switching units,
      second ends of the switching units in the at least one set of switching units are connected to each other,
      at the touch detection stage, the switching units in the at least one set of switching units are turned off under the control of the control signal line,
      at the display stage, the switching units in the at least one set of switching units are turned on under the control of the control signal line,
      the display substrate further comprises a plurality of rows of common electrode blocks (Vcom1) arranged at the touch region, the plurality of rows of common electrode blocks (Vcom1) and the rows of the touch electrodes are arranged in alternating rows, and a common voltage is applied to the plurality of rows of common electrode blocks (Vcom1) at the display stage and not at the touch detection stage.

2. The display substrate according to claim 1, wherein:
each switching unit in the at least one set of switching units is an N-type transistor; and
the control signal line is a gate-controlled high level signal line.

3. The display substrate according to claim 1, wherein the touch electrodes in the respective columns are configured to provide a touch detection driving signal.

4. The display substrate according to claim 1, wherein the display substrate is an array substrate or a color filter substrate.

5. A display device, comprising the display substrate according to claim 1.

6. The display substrate according to claim 1, wherein at the display stage, the touch electrodes in all the columns at the touch region are connected together at a peripheral region of the display substrate and serve as common electrodes.

7. The display substrate according to claim 1, further comprising a common electrode line, to which the second ends of the switching units in the at least one set of switching units are connected.

8. The display substrate according to claim 7, further comprising a driver circuit located at a lower portion of the display substrate.

9. The display substrate according to claim 8, wherein:
the at least one set of switching units is located at an upper portion of the display substrate; and
at a position opposite to that of a connecting end of the driver circuit, the connecting end of the driver circuit is configured to connect with the touch electrodes in the respective columns.

10. The display substrate according to claim 9, wherein:
the at least one set of switching units consists of two sets of switching units;
a number of the common electrode lines is two;
the second ends of the switching units, of one set of switching units, are connected to one common electrode line;
the second ends of the switching units in the other set of switching units are connected to the other common electrode line;
one set of switching units and one common electrode line connected to the one set of switching units are located at a first side of the display substrate;
the other set of switching units and the other common electrode line connected to the other set of switching units are located at a second side of the display substrate opposite to the first side; and
the touch electrodes in each column are connected to the first end of one switching unit in the at least one set of switching units located at the first side of the display substrate and to the first end of one switching unit in the at least one set of switching units located at the second side of the display substrate.

11. The display substrate according to claim 1, comprising a plurality of touch regions, wherein:
a number of the columns of the touch electrodes at each touch region is identical to a number of the switching units in each set of switching units; and the touch electrodes in an ith column at each touch region are connected to the first end of an ith switching unit in each set of switching units, where i is a positive integer greater than or equal to 1 and less than or equal to the number of the switching units in each set of switching units.

12. The display substrate according to claim 11, wherein there are twelve columns of the touch electrodes at each touch region and twelve switching units in each set of switching units.

13. The display substrate according to claim 11, wherein:
the plurality of touch regions respectively corresponds to a plurality of sets of switching units;
the plurality of sets of switching units are arranged at a first side of the display substrate or a second side of the display substrate opposite to the first side;
the plurality of touch regions are arranged sequentially along a direction from an upper portion of the display substrate to a lower portion of the display substrate; and
the plurality of sets of switching units corresponding to the plurality of touch regions are arranged sequentially along the direction from the upper portion of the display substrate to the lower portion of the display substrate.

14. The display substrate according to claim 13, wherein:
when one touch region is closer to the upper portion of the display substrate, the at least one set of switching units corresponding to the one touch region is closer to the upper portion of the display substrate; and
when one touch region is farther away from the upper portion of the display substrate, the at least one set of switching units corresponding to the one touch region is farther away from the upper portion of the display substrate.

15. The display substrate according to claim 11, wherein:
for each touch region of the plurality of touch regions, one set of switching units is arranged at each of a first side and a second side opposite to the first side of the display substrate;
the plurality of touch regions are arranged sequentially along a direction from an upper portion of the display substrate to a lower portion of the display substrate;
a plurality of sets of switching units corresponding to the plurality of touch regions and located at the first side of the display substrate are arranged sequentially along the direction from the upper portion of the display substrate to the lower portion of the display substrate; and
a plurality of sets of switching units, corresponding to the plurality of touch regions and located at the second side of the display substrate are arranged sequentially along the direction from the upper portion of the display substrate to the lower portion of the display substrate.

16. The display substrate according to claim 15, wherein:
when one touch region is closer to the upper portion of the display substrate, the at least one set of switching units corresponding to the one touch region is closer to the upper portion of the display substrate; and
when one touch region is farther away from the upper portion of the display substrate, the at least one set of switching units corresponding to the one touch region is farther away from the upper portion of the display substrate.

17. The display substrate according to claim 1, wherein the at least one set of switching units is arranged at a peripheral region.

18. The display substrate according to claim 17, wherein the at least one set of switching units is arranged at a dummy region of the peripheral region.

19. A method for driving a display substrate including a plurality of touch electrodes, at least one set of switching units, control signal lines, and a plurality of rows of common electrode blocks (Vcom1), the plurality of touch electrodes being arranged in columns and rows at a touch region of the display substrate, the touch electrodes in each column being directly connected together, for each switching unit in the at least one set of switching units, a corresponding one of the control signal lines being connected to a control end of the switching unit, for each column of the columns, the touch electrodes in the column being connected to a first end of a corresponding switching unit in the at least one set of switching units, the touch electrodes in the respective columns at the touch region being connected to different switching units, second ends of the switching units in the at least one set of switching units being connected to each other, the plurality of rows of common electrode blocks (Vcom1) being arranged at the touch region, and the plurality of rows of common electrode blocks (Vcom1) and the rows of the touch electrodes being arranged in alternating rows, the method comprising:

at the display stage, connecting touch electrodes in all the columns at the touch region together by turning on, under the control of the control signal lines, the switching units in the at least one set of switching units;

at the touch detection stage, disconnecting the touch electrodes in each column at the touch region from the touch electrodes in the other columns by turning off, under the control of the control signal lines, the switching units in the at least one set of switching units; and causing the touch electrodes in all the columns to serve as common electrodes and applying a common voltage to the plurality of rows of common electrode blocks (Vcom1) at the display stage and not at the touch detection stage.

* * * * *